United States Patent
Reuben

(10) Patent No.: US 9,380,893 B2
(45) Date of Patent: Jul. 5, 2016

(54) THERMALLY INSULATING STRETCHABLE DOWN FEATHER SHEET AND METHOD OF FABRICATION

(71) Applicant: Ronie Reuben, Montreal (CA)

(72) Inventor: Ronie Reuben, Montreal (CA)

( * ) Notice: Subject to any disclaimer, the term of this patent is extended or adjusted under 35 U.S.C. 154(b) by 0 days.

(21) Appl. No.: 13/999,094

(22) Filed: Jan. 13, 2014

(65) Prior Publication Data

US 2015/0196145 A1    Jul. 16, 2015

(51) Int. Cl.
| | |
|---|---|
| A47G 9/02 | (2006.01) |
| B05D 1/26 | (2006.01) |
| B05D 3/02 | (2006.01) |
| B05D 3/04 | (2006.01) |
| B05D 3/12 | (2006.01) |
| B32B 37/24 | (2006.01) |

(Continued)

(52) U.S. Cl.
CPC ............. *A47G 9/0223* (2013.01); *B05D 1/265* (2013.01); *B05D 3/0254* (2013.01); *B05D 3/0426* (2013.01); *B05D 3/12* (2013.01); *B32B 1/00* (2013.01); *B32B 5/022* (2013.01); *B32B 5/028* (2013.01); *B32B 5/04* (2013.01); *B32B 7/08* (2013.01); *B32B 9/02* (2013.01); *B32B 9/047* (2013.01); *B32B 37/24* (2013.01); *B60R 13/0815* (2013.01); *B32B 37/20* (2013.01); *B32B 2037/243* (2013.01); *B32B 2305/18* (2013.01); *B32B 2307/304* (2013.01); *B32B 2307/51* (2013.01); *B32B 2307/724* (2013.01); *B32B 2317/00* (2013.01); *B32B 2317/10* (2013.01); *B32B 2437/00* (2013.01); *B32B 2509/00* (2013.01); *B32B 2605/00* (2013.01); *B32B 2605/003* (2013.01); *B68G 3/08* (2013.01); *D06M 19/00* (2013.01); *Y10S 5/95* (2013.01)

(58) Field of Classification Search
CPC ........... B68G 3/08; D06M 19/00; Y10S 5/95; Y10T 428/254; Y10T 428/25; Y10T 428/23; B32B 5/00–5/09
See application file for complete search history.

(56) References Cited

U.S. PATENT DOCUMENTS

| | | | | |
|---|---|---|---|---|
| 5,388,891 A | * | 2/1995 | Oka ....................... | A47C 27/22 297/452.27 |
| 6,025,041 A | * | 2/2000 | Reuben ................ | A47G 9/0207 428/15 |

(Continued)

FOREIGN PATENT DOCUMENTS

DE    3204703 A1    8/1983

OTHER PUBLICATIONS

Haller, M.; "How to Choose Specialty Bedding for Winter", Guides at Overstock.com, 2011, p. 1-2, Accessed at http://web.archive.org/web/20110304091652/http://www.overstock.com/guides/how-to-choose-specialty-bedding-for-winter.*

(Continued)

*Primary Examiner* — Mark Ruthkosky
*Assistant Examiner* — Julia L Rummel
(74) *Attorney, Agent, or Firm* — Houle Patent Agency Inc.

(57) ABSTRACT

A thermally insulating stretchable down feather sheet and its method of manufacture is described. The core of the sheet is comprised of down feathers mixed with a binder which exhibits elastic properties. The core is sandwiched between a top and bottom stretchable elastomeric sheet having multi-directional stretchability. The core down feathers and the binder as well as the elastomeric sheet and bound together by heat treatment to provide a down feather insulating sheet which is stretchable in all directions without fractioning the sheet.

11 Claims, 2 Drawing Sheets

(51) Int. Cl.
*B60R 13/08* (2006.01)
*B32B 5/02* (2006.01)
*B32B 5/04* (2006.01)
*B32B 7/08* (2006.01)
*B32B 9/02* (2006.01)
*B32B 9/04* (2006.01)
*B32B 1/00* (2006.01)
*B68G 3/08* (2006.01)
*D06M 19/00* (2006.01)
*B32B 37/20* (2006.01)

(56) References Cited

U.S. PATENT DOCUMENTS

| | | | | |
|---|---|---|---|---|
| 2004/0043207 A1* | 3/2004 | Donovan | ............... | D01F 8/18 428/304.4 |
| 2004/0126580 A1* | 7/2004 | Gaignard | ............... | D04H 1/02 428/373 |
| 2007/0141940 A1 | 6/2007 | Baychar | | |
| 2009/0176428 A1* | 7/2009 | Tatsuno | ............... | A47G 9/086 442/239 |
| 2010/0093243 A1* | 4/2010 | Uemura | ............... | B32B 27/12 442/304 |
| 2012/0328887 A1* | 12/2012 | Ryan | ............... | B27N 3/06 428/446 |

OTHER PUBLICATIONS

Rei, "How to Layer Outerwear", 2001, p. 1-2; Accessed at http://web.archive.org/web/20011224172416/http://www.expeditionsamoyeds.org/reiwww.html.*

Supplementary European Search Report with regard to the European Patent Application 14877874.9 (regional phase of PCT/CA2014/000834) dated Feb. 8, 2016.

English Abstract of DE3204703 retrieved on Espacenet on May 5, 2016.

* cited by examiner

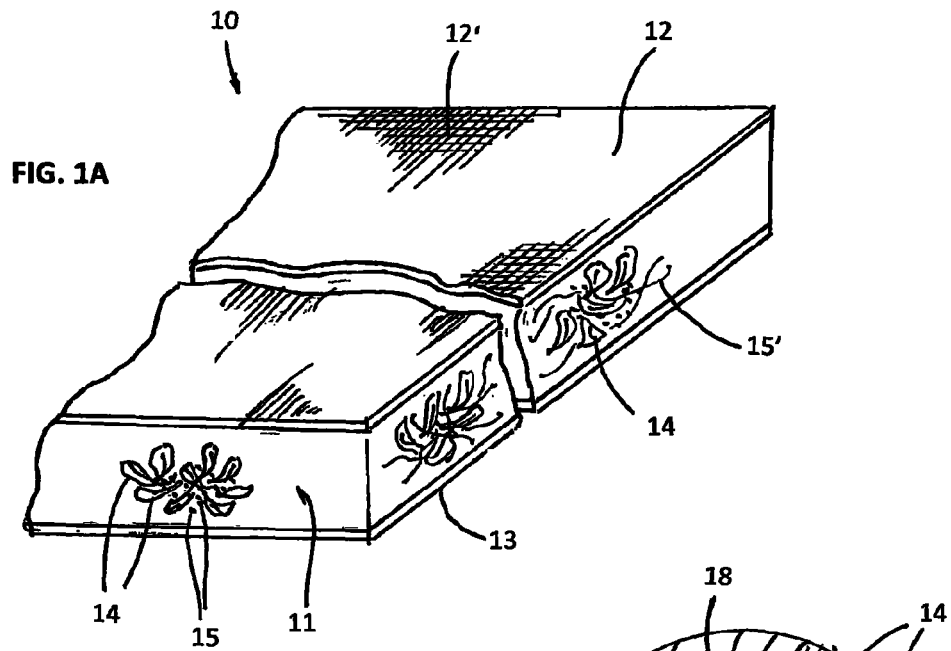
FIG. 1A
FIG. 1B
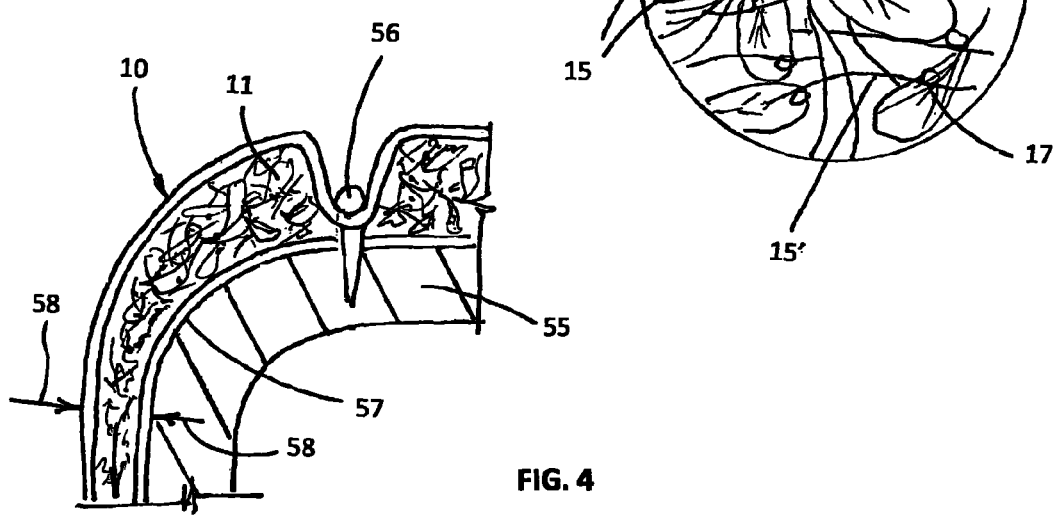
FIG. 4

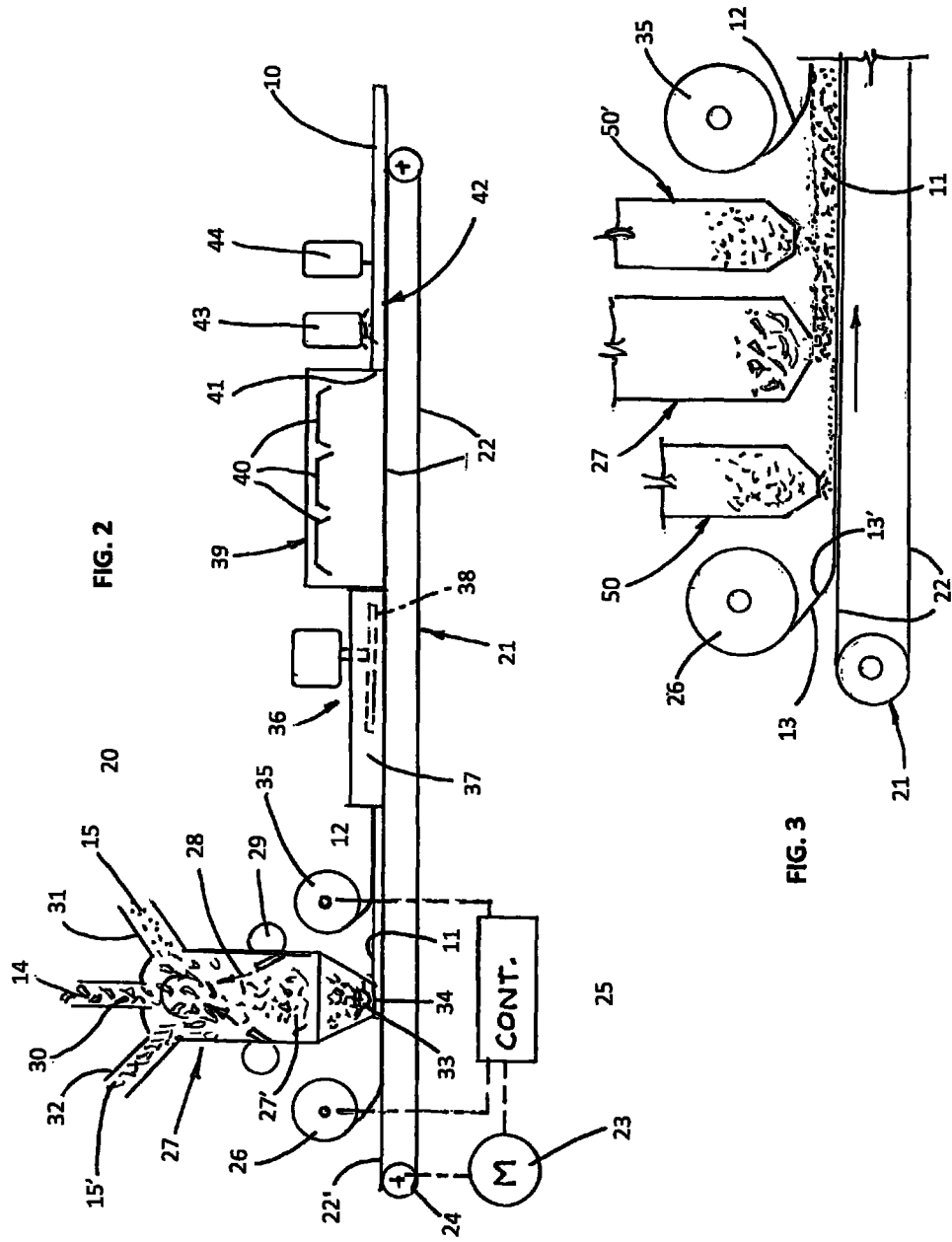

THERMALLY INSULATING STRETCHABLE DOWN FEATHER SHEET AND METHOD OF FABRICATION

TECHNICAL FIELD

The present invention relates to a thermally insulating down feather sheet and particularly to one that has multi-directional stretchability and its method of fabrication.

BACKGROUND ART

In my U.S. Pat. No. 6,025,041 I describe a first generation down feather sheet and wherein the down feathers are retained in a homogeneous form by a chemical binder agent or rigid fibers and further wherein the down feathers are exposed on all sides of the sheet. A primary purpose of that down feather sheet was to provide a sheet of down feathers for use by the apparel fabricating industry as superior insulation in garments. Such a down feather sheet provided a constant distribution of the down feathers and thus prevented the development of cold spots in the insulation. Because the down feathers are exposed in all outer surfaces of the down feather sheet extra care was necessary to prevent the down feathers from detaching from the faces of the sheet or patterns cut from the sheet.

There is a need to develop a down feather sheet for use in many other applications to provide improved thermal insulation, such as in the construction of vehicles where the passenger enclosure which is climatically controlled during hot or cold weather condition needs to be well insulated. Countless other applications exist as one can imagine. However, for such commercial use, as well as in the fabrication of articles of apparel, there is a need to retain the down feathers captive in the sheets or patterns and to make down feather sheet stretchable (elastic) whereby it can be stretched during installation or use when the need arises to do so.

More recently, such down feather sheets have been held captive between sheets of non-woven fabrics adhered to opposed top and bottom surfaces of the sheets and held thereto by a glue binder present at the interface with the down feathers. Although, that solution did prevent some escapement of the down feathers, it did not provide for the use of such material in other industrial manufacturing applications as the material, although flexible did not provide for stretching of the sheet to attach it to flexible and rigid shaped objects and in restricted spaces where it is necessary for the sheet to stretch. Also, when used in garments in areas where movement is required such as in underarm areas or knee areas of clothing, rigid down insulating sheets when stretched would tear to form clumps of insulation which would gather in specific areas and become visible to the eye and form cold spots in the garment. Therefore, that improvement did not overcome these existing problems to extend the use of such down feathers sheets.

SUMMARY OF THE INVENTION

It is a feature of the present invention to provide a down feather sheet in a form which is breathable, soft, lightweight, and stretchable while substantially preventing the escape of down feathers from the opposed surfaces of the down feather sheet.

Another feature of the present invention is to provide a down feather sheet wherein the down feathers are held together by a binder exhibiting elastic properties and wherein at least one stretchable elastomeric sheet having multi-directional stretching is bound to an outer one of a top or bottom surface of the down feather sheet.

Another feature of the present invention is to provide a down feather sheet formed from down feathers bound together by elastic glue/polymer elastic filaments which also bind the outer elastomeric sheets.

Another feature of the present invention is to provide a method of fabricating a thermally insulating stretchable down feather sheet having the above mentioned features and capable of fulfilling the above mentioned needs.

According to the above features, from a broad aspect, the present invention provides a thermally insulating stretchable sheet comprising a core consisting of a mixture of down feathers and a binder exhibiting elastic properties mixed together with the down feathers in predetermined proportions to form a stretchable down feather core. A sheet of stretchable material having multi-directional stretchability capable of stretching in all directions is bound to an upper and a lower surface of the core. The down feather core and the sheet of stretchable material have recovery properties wherein the thermally insulating stretchable sheet is capable of recovering substantially its original relaxed form after stretching or deformation.

According to another broad aspect, of the present invention a stretchable elastomeric sheet having multi-directional stretchability is bound to opposed ones of the top and bottom surfaces of the stretchable down feather core by the binder mixed with the down feathers and the polymer content in said stretchable elastomeric sheets.

According to a still further broad aspect of the present invention there is provided a method of fabricating a thermally insulating stretchable down feather sheet which comprises the steps of mixing in a mixing chamber a predetermined volume of down feathers with a predetermined volume of a dry binder exhibiting binding and elastic properties when subjected to a thermal treatment above a softening point of the binder. An elastomeric sheet is displaced under a depositing outlet of the mixing chamber where a substantially uniform layer of the down feathers mixed with the binder is deposited on a top surface of the elastomeric sheet. The stretchable elastomeric sheet with the substantially uniform layer of the down feathers mixed with the binder is then conveyed to a thermal chamber to be subjected to a thermal treatment to trap and bond the down feathers and the binder together and to the elastomeric sheet to form the thermally insulating stretchable down feather sheet which is then conveyed out of the thermal chamber as a continuous bonded stretchable down feather sheet.

DESCRIPTION OF THE DRAWINGS

A preferred embodiment of the present invention will now be described with reference to the accompanying drawings, in which:

FIG. 1A is a perspective view of a thermally insulating stretchable down feather sheet constructed in accordance with the present invention and FIG. 1B is an enlarged view illustrating the down feather mixture with binding fibers and glue particles:

FIG. 1*b* is an enlarged view of a section of the down feather core and wherein the down feathers are trapped and bound together by elastic glue and stretchable filaments to form a stretchable down feather core;

FIG. 2 is a schematic illustration showing a method of fabricating the thermally insulating stretchable down feather sheet using a binder having elastic properties mixed with the down feathers and held captive between opposed elastomeric sheets having multi-directional stretchability;

FIG. 3 is a schematic illustration showing a modification of FIG. 2 wherein a coating of a tackifier binder is applied between the down feather sheet and the outer elastomeric sheets, and FIG. 4 is an enlarged and partly fragmented section view illustrating an application of the thermally insulating stretchable down feather sheet and wherein the sheet is stretched and secured to an irregular shaped member.

DETAILED DESCRIPTION OF THE PREFERRED EMBODIMENTS

Referring now to the drawings, and particularly to FIGS. 1A and 1B, there is shown at 10 a thermally insulating stretchable down feather sheet constructed in accordance with the present invention. It is comprised of a down feather main core 11 sandwiched between a top and a bottom stretchable elastomeric sheet 12 and 13, respectively. The binder 15 is an elastic glue or stretchable polyester fibers whereby to form a core which exhibits elastic properties permitting it to stretch with the elastomeric sheets with no or minimum fracture to the core. As shown in FIG. 1B, a combination of stretchable polyester fibers and elastic glue is illustrated.

The expression "elastomeric" as used herein is meant to have the meaning of elastic or stretchable wherein the sheet or fibers are capable of recovering substantially its original relaxed form after stretching or deformation. Also, elastomeric goods, in the form of sheets, films, nettings, nonwovens, fibers, threads and the like are basically isotropic, exhibiting essentially the same properties in all directions of their two dimensional plane. Such elastomeric goods as utilized with the present invention are for example polyurethane resins which are capable of fusing when subjected to heating whereby to bond. Some elastic polymer filaments 15' are formed from styrene strands and some may exhibit an elongation to break of at least 200%, and when released from stretching retreats to about 125% of its original length. Many of such fibers or filaments and nonwovens are currently available in the trade. Webs made thereof provide excellent stretchable characteristics, breathability, softness, lightweight and weathering resistance.

The elastomeric sheets 12 and 13 may also be in the form of netting such as denoted by reference numeral 12' in FIG. 1a and comprised of polymer filaments produced by extrusion streams to form a regular array of weft and warp stretchable filaments bonded together at their crossings to produce a net which exhibits multi-directional stretching. An example of such is fabricated from Nylon 6 and polypropylene. Such nettings are disclosed in U.S. Pat. No. 4,636,419, the disclosure of which is herein incorporated by reference. U.S. Pat. No. 4,241,123 also discloses known prior art wherein nonwoven netting is formed by a first group of melting monofilaments are die extruded and a second group of monofilaments or a yarn is crossed, pressed and heat welded to form a plastic netting capable of softening under heat treatment to bond to the core binder and also capable of stretching in all directions.

FIG. 1b is an enlarged view illustrating the mixture of the down feathers with a binder which is constituted by a mixture of the elastic glue particles 15 and the elastic polymer filaments 15'. As can be seen such as identified by reference numeral 17, some of the glue particles that are melted bind to both the down feathers 14 and the elastic polymer filaments 15' and thus provide improved bonding of the elements and entrapment of the down feathers preventing the down feathers from escaping from the side edges of the sheet 10. As also denoted by reference numeral 18, the filaments 15' bind to themselves at their crossings and to the down feathers and extend in all directions. The interconnections of the filaments with one another or through the down feathers form bridges across the core and maintain the composition homogeneous.

With reference now to FIG. 2 there will be described the method of fabricating the thermally insulating stretchable down feather sheet 10 of the present invention. As herein shown, the machine 20 comprises a conveyor 21 having an endless belt 22 fabricated from a non-stick material and capable of withstanding heat up to at least 150 degrees C. The belt extends through the machine length as herein shown although the conveyor may be constituted by two or more driven conveyor belt sections synchronized to one another. The belt is driven by a motor 23 coupled to a drive drum or sprocket 24, the speed of which is controlled by a controller circuit 25 whereby to control the thickness or density of the down core 11 deposited on the belt. The different operating parameters of the machine are programmed in the controller and can be adjusted.

At the inlet end of the conveyor 21 there is supported a roll 26 containing a supply of the stretchable elastomeric sheet 13 which is dispensed on the top surface 22' of the conveyor belt at a speed synchronized with the speed of the conveyor belt 22. An air mixing chamber 27 is supported above the top run 22' of the conveyor and is preferably, although not exclusively, constructed of clear plastic whereby to view the operation therein of the air turbulence mixing action of the down feathers 14 with the binder glue particles and/or stretchable fibers. Air mixing currents 28 are injected at an upward angle inside the mixing chamber 27 by blowers 29, the air speed of which may be regulated by the controller settings. The down feathers 14 are fed into the mixing chamber 27 at a control rate via a feed chute 30. The dry elastic glue particles 15 and/or elastic filaments 15' are also fed at a predetermined volume to the mixing chamber 27 via a chute 31. The elastic glue particles are released in volume to comprise 6% to 20% of the mixture with the down feathers and preferably 6% to 12%. Likewise, when the binder is a stretchable elastic filament 15' it is fed to the mixing chamber 27 via a separate chute 32. The stretchable elastic filaments comprise 6% to 30% of the down feather mixture and preferably 6% to 12%. The binder may also be constituted by a blend of the elastic glue particles 15 and the stretchable or elastic filaments 15' in the above proportions of the glue. The elastic glue binder as herein contemplated has a softening binding point above 80 degrees C. while the elastic filaments which are low molecular weight polymers may have a softening point slightly below 80 degrees C. As the down and binder mix in the upper part of the mixing chamber, the mixture starts to precipitate downwards to the lower part 27' of the chamber where a dispensing rotor 33 is rotated to dispense the mixture through a bottom depositing outlet 34 of the mixing chamber 27 at a constant volume onto elastomeric sheet 13. By controlling the speed of the conveyor belt, the thickness of the deposited mixture is controlled and this is accomplished by the conveyor speed setting in the controller 25.

Downstream of the mixing chamber there is supported a second roll 35 containing a supply of the stretchable elastomeric sheet 12 which is applied on the top surface of the down core sheet 11 exiting its passage from under the mixing chamber 27. Optionally, a down feather core sheet restrainer device 36 may be supported across the conveyor belt 22 to restrain the down feather mixture on opposed sides thereof by adjustable guide side walls 37 supported above and close to the top surface of the conveyor belt 22 to prevent the down mixture from escaping from the side edges thereof. The elastomeric sheet 12 restrains the top surface of the down feather mixture. Additionally, a top compression plate 38 may span across the conveyor belt above the down mixture to gradually compress the mixture if desired prior to entry into a thermal chamber 39. If it is desired to support the down feather and binder mixture on the bottom elastomeric sheet only, then the second roll 35 of the elastomeric sheet is not necessary. However, to retain the down feather mixture in place the top compression plate 38 would act as a covering over the top surface of the down feather mixture with the binder.

The thermal chamber 39 is of a predetermined length and provided with heating devices 40 capable of generating controlled heat in the thermal chamber in the range of from about 80 degrees C. to 160 degrees C. to melt the elastic glue 15 and/or elastic filaments 15'. At the outlet 41 of the thermal chamber exits the thermally insulating stretchable down feather sheet 10 of the present invention and it may be conveyed along a cooling end section 42 of the conveyor 21 to cool the sheet 10. Alternatively, cooling air blowers 43 may be mounted above the exit end section 42 of the conveyor to provide for rapid cooling of the sheet 10. A slitter device 44 can then sever the sheet into sections or pattern cutters such as laser cutters may be installed to cut patterns from the sheet 10 after it has sufficiently cooled. Such slitting and pattern cutting can also be performed at a remote location. Also, the sheet exiting the thermal chamber can be gathered in roll form or sheet form for transportation.

Referring now to FIG. 3 there is illustrated a further modification of the machine 20. As herein shown a tackifier or plasticizer applicator 50 and 50' may be positioned adjacent the entry end and exit end respectively of the mixing chamber 27 whereby to release a small quantity of a tackifier on the top surface 13' of the stretchable elastomeric sheet 13 and the top surface of the down feather and binder mixture for added stretchable adhesive material. The tackifier may be constituted by the elastic glue particles or the elastomeric binding filaments whereby to enhance the binding at the interfaces of the stretchable elastomeric sheets 12 and 13 with the down feather core 11. This is particularly useful if the elastomeric sheets are constituted by netting which improves breathability and wherein the added tackifier further prevents the down from being released through the interstices of the netting.

As shown in FIG. 4, because the thermally insulated down feather sheet 10 of the present invention is stretchable it can accordingly be used in numerous insulating applications. As herein shown, the sheet is secured to a rigid curved body 55 by fasteners, one fastener 56 herein illustrated, and is stretched in a curved area 57 of the body 55 where the sheet 10 is stretched thereby stretching and compressing the core material 11 in the zone identified by arrows 58 and without fracturing the sheet due to its stretchability. Similarly, when the sheet 10 is sown in articles of apparel the same stretching occurs in certain areas of the apparel where there is movement stretching the insulation such as in vents provided in arm pit area of jackets, etc. The breathability of the insulating stretchable down feather sheet 10 also provides for the passage of humidity and air flow when positioned in vent areas of certain articles of apparel or any area where such breathability feature is required. The thermally insulating stretchable down feather sheet can be secured to various elements by many types of securement means, such as glue, stitching, heat bonding, etc.

The above description of the preferred embodiment is intended to cover equivalents of the specific examples described provided such equivalents fall within the scope of the appended claims.

The invention claimed is:

1. A thermally insulating stretchable sheet comprising
a core consisting of a mixture of down feathers and a binder exhibiting elastic properties that are mixed together in predetermined portions, said binder consisting of heat-fused stretchable glue particles and fused elastomeric binding strands;
and first and second sheets of stretchable material having multi-directional
stretchability capable of stretching in all directions bound respectively to an upper and a lower surface of said core;
said core and said sheets of stretchable material having shape-recovery properties, wherein said thermally insulating stretchable sheet is capable of recovering substantially to its original relaxed form after stretching or deformation.

2. The thermally insulating stretchable sheet as claimed in claim 1, wherein each of said stretchable sheets is a heat-fusible material and is heat-fused to a respective one of said upper and lower surfaces of said core.

3. The thermally insulating stretchable sheet as claimed in claim 1, wherein said core is made by combining 6% to 20% by volume of fusible dry glue particles with down feathers.

4. The thermally insulating stretchable sheet as claimed in claim 1, wherein said core is made by combining 6% to 12 volume of fusible dry glue particles with down feathers.

5. The thermally insulating stretchable sheet as claimed in claim 1, wherein said core is made by combining 6% to 30% volume of heat-fusible elastomeric binding strands with down feathers.

6. The thermally insulating stretchable sheet as claimed in claim 1, wherein said core is made by combining 6% to 12% by volume of heat-fusible elastomeric binding strands with down feathers.

7. The thermally insulating stretchable sheet as claimed in claim 1, wherein said binder has a softening point above 80 degrees C. and is capable of being subjected to a thermal treatment of between 80 degrees C. to 150 degrees C.

8. The thermally insulating stretchable sheet as claimed in claim 1, wherein said elastomeric binding strands are polymer strands having a softening point below 80 degrees C.

9. The thermally insulating stretchable sheet as claimed in claim 2, wherein said stretchable sheet is an elastomeric netting composed of warp and weft polymer strands fused together at crossing points between the polymer strands and exhibiting excellent flexibility, adhesive properties, and air permeability.

10. The thermally insulating stretchable sheet as claimed in claim 9, wherein said polymer strands are styrene strands or blends thereof.

11. The thermally insulating stretchable sheet as claimed in claim 1, wherein each of said sheets of stretchable material is an elastomeric sheet.

* * * * *